E. Langen,

Furnace Grate.

No. 2,760. Reissued Sep. 3, 1867.

Witnesses:
Wm. Freeman
W. Dean Overell

Inventor:
E. Langen
By Munn & Co
Attys

N. PETERS, PHOTO-LITHOGRAPHER, WASHINGTON, D. C.

United States Patent Office.

EUGEN LANGEN, OF COLOGNE, PRUSSIA.

*Letters Patent No.* 50,996, *dated November* 14, 1865; *reissue No.* 2,760, *dated September* 3, 1867.

GRATE FOR FURNACES.

The Schedule referred to in these Letters Patent and making part of the same.

TO ALL WHOM IT MAY CONCERN:

Be it known that I, EUGEN LANGEN, of Cologne, in the Kingdom of Prussia, inventor of an Improvement in Furnace-Grates, secured to me by Letters Patent of the United States, dated November 14, 1865, having been advised by counsel learned in the law that my said patent is insufficient on account of defective specification thereof, and having made application for a reissue thereof, do hereby declare that the following is a full and complete description of my said invention. I may remark here that my invention was patented in Prussia in 1860, and in England a little later.

Fire-grates generally are so constructed that the fresh fuel is thrown upon that which is already undergoing combustion, so that the atmospheric air, before it is allowed to reach the fresh fuel, is compelled to pass through the incandescent mass, where it is deprived of all or nearly all its oxygen, and reaches the fresh fuel in the form of hot carbonic acid, which takes up another atom of carbon, and becomes carbonic oxide, thus consuming a quantity of fuel without producing a useful effect. Furthermore, a valuable portion of the fuel, (more or less, according to the nature of the fuel,) is driven out in the form of vapor and of gases, which pass off unconsumed, mixed with minute particles of coal, and commonly designated by the term smoke.

The grate which forms the subject-matter of this present invention is so constructed that the fuel is introduced without difficulty under the incandescent mass already on the grate, with the advantage well known to pertain thereto.

I will first proceed to describe what I consider the best means of carrying out my invention, and will afterwards designate the points which I believe to be new. The accompanying drawings form a part of this specification.

Figure 2:
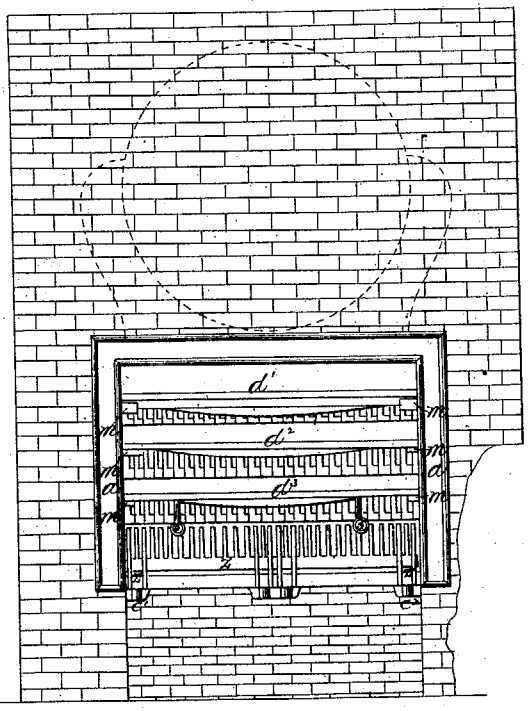
Figure 1:
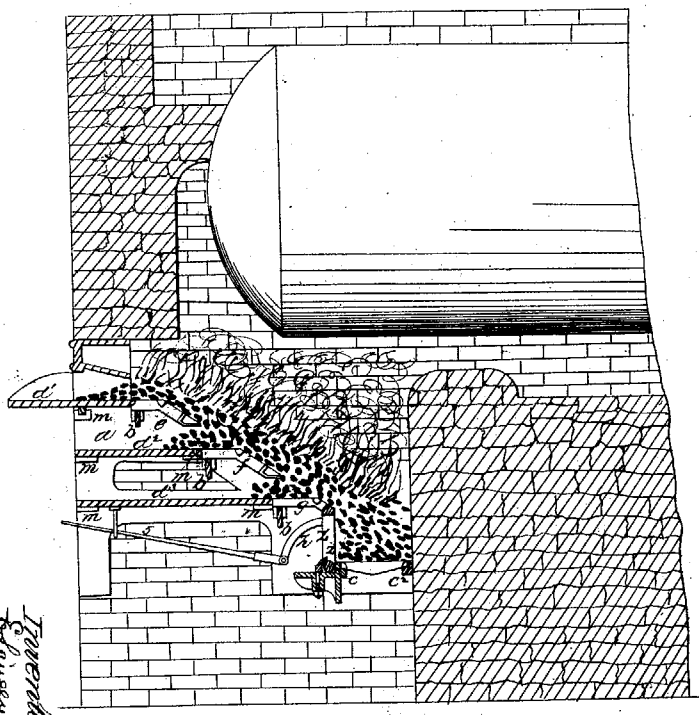

Figure 1 is a longitudinal vertical section through a brick furnace having my improved grate, and Figure 2 is a front elevation of the furnace and grate.

Similar letters of reference indicate the like parts in all the figures.

The sides of my furnace are constructed with castings *a*, of the form represented, which are adapted to form the supports for the several parts to be hereafter described. The space between these plates is traversed transversely by cast-iron girders or cross-bars, as indicated by *b*. I supply the fuel to my grate at different levels, and thrust the fresh fuel under the fuel previously on the grate. The effect is to heat the fresh fuel and cause it to give off its volatile combustible matter, while it is covered with a stratum of intensely burning fuel, so that the combustible gases from the fresh fuel, in passing through the well-burning fuel previously supplied, are certain to be ignited. In the furnace represented, there are but three horizontal plates, $d^1$, $d^2$, and $d^3$, for the reception of the fresh fuel, to be supplied in this manner to the fire; but a greater number may be used with advantage in other furnaces. The coal, coke, peat, or other fuel, is supplied in small quantities, by being shovelled, or otherwise placed upon the several plates $d^1$, $d^2$, and $d^3$, and is pushed forward by any suitable implement. From the inner ends of the plates $d^1$ $d^2$ $d^3$ extend the angular grate-bars *e f g*, which are provided at their under edges with notches that drop over the upper edges of cross-bars *b*, secured between the side plate of the furnace, and their tails extend under the plates $d^1$ $d^2$ $d^3$, whereby they are firmly held in position. The fuel, on being pushed forward on the plate $d^1$, rests upon the partially horizontal and partially inclined grating *e*, which, being open like ordinary grates, receives the air, which enters freely through the space between the plates $d^1$ and $d^2$, and traversing inward and upward through the partially inclined and partially horizontal grate *e*, passes up through the fresh fuel, and thence through that previously supplied, inducing an intense heat, under conditions which consume perfectly all of the combustible matter.

The fuel which is placed on the plate $d^2$, on being similarly pushed through the space under the lower edge of the inclined grate *e*, is distributed upon the partially horizontal and partially inclined grate *f*, and is burned under similar conditions, the air for its combustion entering through the ample space between the plate $d^2$ and the plate $d^3$.

The proportion between the horizontal and inclined portion of the grate *f* is different from the proportions of these elements in the grate E, there being a greater proportion of horizonal surface, but both parts are efficient in allowing the air to enter; and in both grates, the fresh air being admitted, strikes first upon the fresh fuel, and after traversing through it, conveying away any combustible gases which are liberated by the heat, passes afterwards, mixed with the latter, into and through the stratum of previously ignited fuel.

The fuel which is placed on the lowermost plate $d^3$, on being similarly pushed forward, passes through the space under the lower edge of the grate $f$, upon the partially horizontal and partially inclined grate $g$. The proportions of this latter grate are greatly different from either of the before described, nearly the whole of this grate $g$ being horizontal, and a very small part being inclined, as represented.

The fresh air, to rise through this grate $g$, enters through the ample space below the horizontal plate $d^3$. The fuel here supplied burns under the same conditions, as before described. I place the inclined portion of this section $g$ forward of the line of the inclined portions above, and thereby induce the fuel to rest and accumulate on this section. There is a tendency in the whole apparatus to allow the clinkers and ashes resulting from the combustion of the coal to traverse slowly downward along the inclined surface of the fire, so that a greater proportion of old and nearly consumed fuel lies upon and near this grate $g$ than lies upon and near the other portions $e$ $f$. This does not, however, in ordinary cases, materially affect the action of the fire. The air entering through this grate $g$, as through the others, strikes against the freshly-added fuel, and after passing through the interstices between this fuel, it traverses, together with the combustible gases from the freshly added fuel, through the older and previously ignited fuel, thus inducing, on all of these grates, the perfect combustion before referred to.

$c^1$ $c^2$ are supports extending across between the side plates $a$ $a$, supporting a section of the horizontal grate $j$, through the interstices of which the air may rise freely to support the combustion. The vertical wall between the front edge of the grate $g$ and cross-bar $c^1$ is formed by a movable grate or door, $z$, having an arm, $h$, to which is attached a rod, $s$, by which the door may be let down when it is desired to open it. In performing this movement it turns on the trunnions $z'$, represented, which are held loosely on the plate $c^1$ by means of the hook-bolts $i$, as represented. I use the term "my grate" to designate the whole apparatus here represented, or any of the essential parts therein. In first starting the fire on my grate, it may be well to introduce such a quantity of fuel on the plate $d^3$, as, when pushed forward, shall cover the grate $j$. But after a little time the forward movement of the nearly burned fuel, clinkers, ashes, &c., from the superior portions of my grate, to wit, the portions $f$ and $e$, accumulates the partially burned material in such quantity upon the horizontal grate $j$ as fills it to the proper extent, without introducing any extra quantity of fuel upon the plate $d^3$ to be burned thereon. Incombustible matter may accumulate to such an extent upon this horizontal grate $j$ as to become objectionable. In such case I lower the grated door $z$ by operating the rod $s$, introducing a proper claw or rake, and thus discharge into the ash-pit a quantity of such cinder; after which I immediately shut the grated door $z$ again, and proceed to work the apparatus as before.

Some of the advantages due to certain features of my invention may be separately enumerated, as follows:

First, by reason of the fact that my shelves $d^1$ $d^2$ and sections of grate $e$ $f$ are constructed and arranged as represented, with or without the other parts of my invention, I am able to supply the fresh fuel under the previously burning fuel in the furnace, with little labor and difficulty, by simply shovelling the fuel upon the conveniently accessible shelves $d^1$, &c., and pushing it forward as represented, without exposing the fireman to any considerable heat, and without wasting any accidental droppings into the ash-pit. The fuel is shovelled leisurely upon the shelves $d^1$ $d^2$, and may be pushed forward leisurely; and the arrangement avoids the necessity for opening any door, or admitting any excess of air into the furnace even for a moment. The combustion proceeds uniformly and without disturbance so long as the fire is required to be kept up; and the droppings from the upper section $e$ of the grate are all caught upon the shelves $d^1$ and $d^2$, and carried forward with the fuel thereon, and thus returned into the furnace.

Second, by reason of the fact that my section $j$ is arranged as represented relatively to the superior parts, I am able to retain and burn the cinders so as to extract the last remaining combustible elements therefrom without clogging the other and more effective portions of the fire.

Third, by reason of the fact that my door $z$ is grated and turned as represented relatively to the sections $g$ $j$, and the other parts of my apparatus, I am able to supply air in sufficient quantities to the partially burnt fuel adjacent thereto while the door is shut, and to obtain a very liberal space through which to introduce rakes or other instruments for removing the clinkers when desired.

Having now fully described my invention, together with what I consider the best means of putting it in use, what I claim as new in furnaces, and desire to secure by Letters Patent, is as follows:

1. I claim the employment of two or more shelves or their equivalents, adapted to receive fuel, and allow it to be pushed forward thereon, into and under the fire, at different levels, in combination with grates or their equivalents, connected therewith at different levels, the whole being arranged for joint operation, substantially as and for the purpose herein set forth.

2. I claim the cinder-section or ash-pits $j$, arranged relatively to the shelves, and grates at different levels, substantially as and for the purpose herein set forth.

3. I claim the grated door $z$, turning on trunnions as represented, and arranged to operate relatively to the cinder-support $j$, and the superior portions $f$ $g$ of my compound grate, substantially in the manner and for the purpose herein specified.

EUGEN LANGEN.

Witnesses:

P. BRAUN,

T. P. MUMTING.